Dec. 13, 1927.
A. G. KINYON
CONVEYING APPARATUS
Original Filed July 25, 1925
1,652,281
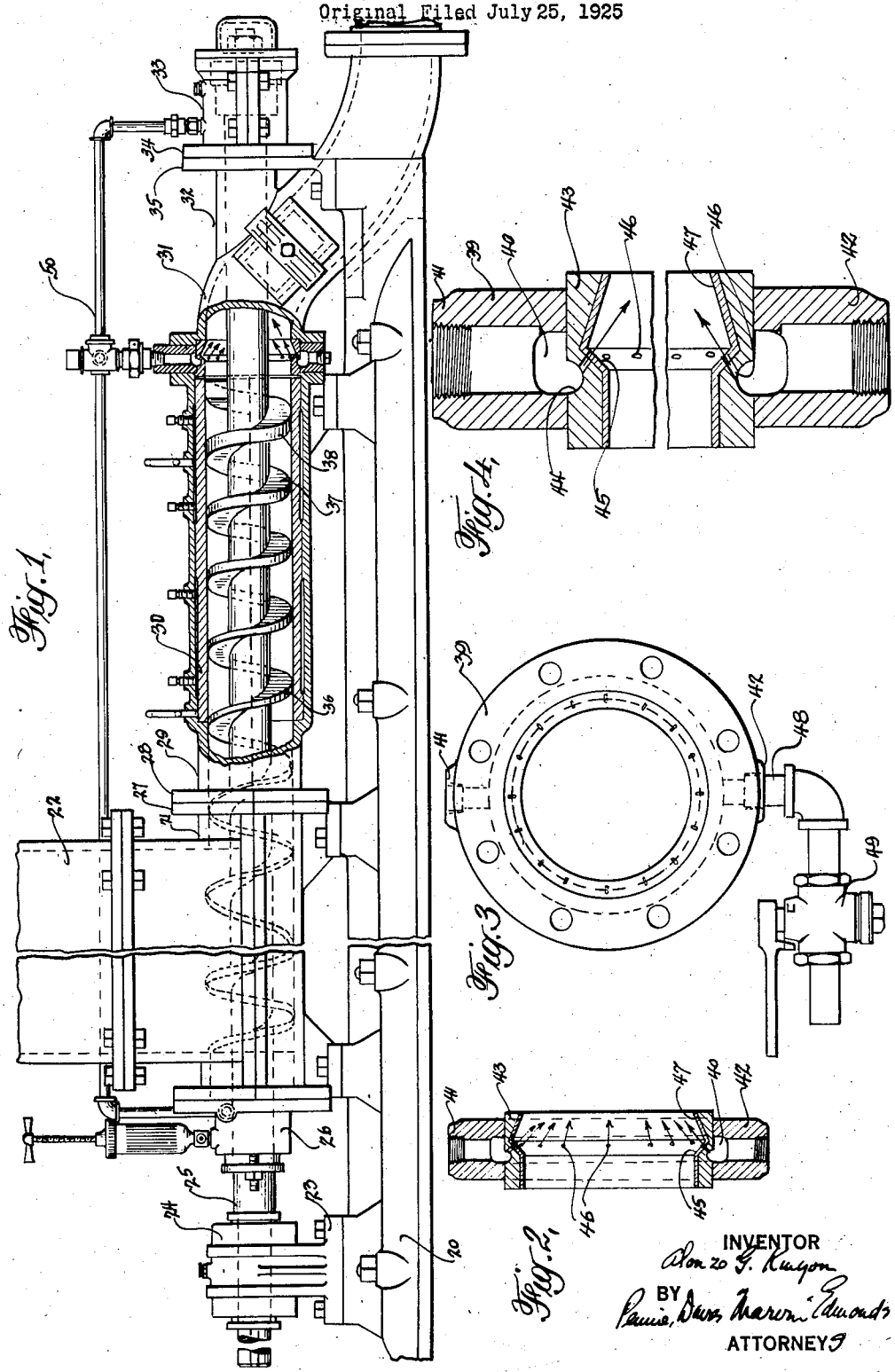
INVENTOR
Alonzo G. Kinyon
BY
Paine, Davis, Marvin, Edmonds
ATTORNEYS Patented Dec. 13, 1927.

1,652,281

UNITED STATES PATENT OFFICE.

ALONZO G. KINYON, OF ALLENTOWN, PENNSYLVANIA, ASSIGNOR TO JAMES W. FULLER, OF CATASAUQUA, PENNSYLVANIA.

CONVEYING APPARATUS.

Original application filed July 25, 1925, Serial No. 45,966. Divided and this application filed October 11, 1926. Serial No. 140,728.

This invention relates to the conveying of material in a finely divided condition, or substances which, in their natural state, are in the form of fine particles. Examples of these materials are pulverized fuel, raw and finished cement, soda ash, talcum powder, starch, and the like. The invention is particularly directed to an improved conveying apparatus for these and other substances of a similar character.

This invention is particularly directed to certain improvements in the apparatus illustrated and described in my Patent No. 1,553,539, issued September 15, 1925, the application for which was copending with my application, Ser. No. 45,966, filed July 25, 1925, of which this case is a division. In the apparatus of the patent, the principle of conveying by mechanical pressure and aeration is utilized and the material is propelled through a transport line by the continuous application of pressure upon a column of material filling the line, the material having been rendered fluent by injection of a gas into it so that the pressure is effective to produce the desired result.

In the patented apparatus the material to be conveyed is continuously fed into a casing connected to the line and within the casing is a shaft provided with a worm or screw by which the material is propelled from the casing into and through the line. The screw is preferably made of varying pitch, or the casing is made with a decreasing diameter toward its discharge end, so that the material is compressed as it advances toward its point of discharge into the line. Immediately prior to its entrance into the line, the material is aerated or rendered fluent by the injection of a gas under pressure, the amount of gas so injected being entirely insufficient to act as a vehicle for the material and merely entering the interstices in the mass to increase the freedom with which the material may be moved.

Practical use of the patented apparatus has shown that it is thoroughly satisfactory for ordinary materials, but when used with materials of a highly abrasive character, such as Portland cement, certain parts of the device are subject to wear. One of these parts is the device by which the fluidizing gas or air is injected into the material, and the present invention is directed to the provision of apparatus in which an improved air injection device is provided, which is arranged to withstand wear and also to provide a better distribution of the air through the mass.

In the new apparatus the material is introduced into a cylindrical casing in which is disposed a shaft bearing flights forming a conveyer screw. At one end of the casing the material enters a discharge section connected to the transport line, and at this end of the casing is a ring through which the shaft extends. This ring includes a channel which extends circumferentially of the casing, and in the face of the ring is an offset shoulder forming a surface of slightly greater diameter than the diameter of the casing. In this shoulder are formed ports connected to the air channel or passage in the ring, and the channel is supplied with air under pressure which issues from the ports and enters the material being propelled through the casing by the screw. The face of the ring is given a special treatment to render it extremely hard and durable, as it has been found that the abrading action of the material is greatest at the point where it leaves the conveyer section. By thus giving the ring a hardened face, and also by placing the ports in a surface which is out of contact with the flowing material, the abrading action of the material is resisted and such abrasion as occurs does not interfere with the injection of air. The new injection device has certain other features of advantage which will be pointed out in the following description.

For a better understanding of the invention, reference will be made to the accompanying drawing, in which Fig. 1 is a view in side elevation and partly in section of the improved apparatus, Fig. 2 is a view in transverse section of the new air ring, Fig. 3 is a view in end elevation, showing the new ring, and Fig. 4 is a view in transverse section on an enlarged scale.

Referring now to the drawing, the apparatus illustrated is shown to include a base 20 of suitable rigid construction, mounted on which is a cylindrical section 21 having a hopper 22 through which the material to be conveyed is introduced into the section 21. Disposed on the base at a distance from the section 21 is a pillow block 23, in which is a bearing 24 for one end of the shaft 25 which enters the section 21 through a stuffing box 26. The section 21 is connected by means of a flange 27 to a flange 28 on a tubular section 29, the latter being made up of upper and lower half sections provided with longitudinal flanges which are suitably secured together. The section 29 also includes upper and lower liner members 30 of wear-resistant material. The shaft 25 extends through the sections 21 and 29 and into an offset discharge section 31 having a tubular extension 32 in its wall, the end of the shaft being supported in a bearing 33 secured by a flange 34 to a flange 35 at the end of the extension 32.

Within the sections 21 and 29 the shaft carries flights 36, together forming a conveyer screw, the pitch of which decreases in the direction in which the material is moved, and the terminal flights 37 and 38 of the screw are likewise increased in thickness. Thus the material being advanced through the casing made up of sections 21 and 29 by means of the screw is subjected to mechanical pressure which compacts the material.

At the end of the section 29 there is disposed the device by which the air or other gas is injected into the material to render it fluent. This device is in the form of a ring which has a body portion 39 formed of cast iron or other suitable material having a port 40 extending circumferentially around it in its inner face. Bosses 41 and 42 are cast on the ring and have openings which communicate with the port 40, these bosses being placed diametrically at the top of the port of the ring. Within the body portion of the ring is a bushing 43 made of steel and pressed into the body with pressure sufficient to insure an air-tight joint. This bushing has a groove 44 formed in its outer face which registers with the port 40 to form a closed channel for the air admitted through the boss 41. The bushing 43 is formed on its inner surface with an angularly inclined shoulder 45 and in the bushing are ports 46 which extend substantially at right angles to the surface of the shoulder 45 and communicate with the channel 40.

These ports extend in a generally radial direction, but their inclination of the axis of the ring varies, the axes of the ports at the top of the ring having a greater inclination to the axis of the ring itself than the axes of the ports near the bottom of the ring. The purpose of this arrangement is to produce a more uniform distribution of air through the material, as it has been found that there is a tendency for the material to move downwardly through the discharge end of the apparatus.

In order to protect the inner face of the bushing 43 from the abrasive action of the material, that surface which is subjected to direct contact with the material is covered with a lamination 47 of some specially hard material, such as the alloy known as stellite. In making the ring this lamination is put in place as follows: The steel bushing 43 is first produced in the ordinary manner, and the ports 46 drilled through it in their proper location. Carbon cores are now placed in the ports and the stellite or other metal which is used for the surface lamination is puddled around the cores, as it is not possible to perforate stellite by devices now in common use. As there are no working parts within the ring, the lamination need not be treated further after it is once placed in position.

When the device is out of operation, any material which has come to rest on the inner surface of the ring may be shaken into the air channel 40 through the lower ports of the ring, due to the vibration of the building in which the apparatus is located. Such an accumulation would in time clog the lower ports, as well as the air space, and when the pump is put in operation this material may clog the line in a solid block and overload the driving motor. In order to avoid this difficulty the lower boss 42 is provided, to which may be connected a pipe 48 with a blow-out valve 49 and before the apparatus is started air is admitted to the ring through the upper connection and the valve 49 is opened to permit any accumulated material in the air channel to be blown out. In normal operation this valve 49 is kept closed, so that the air entering through the upper connection from the pipe 50 is discharged into the material.

It will be seen that in the improved apparatus the air ring which is placed at the point where the greatest abrasive action of the material has been found to occur, is provided with a hardened face which has an unusually long life. If, after a period of use, this lamination becomes worn, the bushing 43 may be removed from the main body of the ring and another one placed in position. By providing the bushing with the offset shoulder 45 through which the ports discharge air into the mass material, the material is kept free of the port openings and these openings cannot be worn or clogged by the action of the material. Furthermore, by the particular arrangement of the ports described a more nearly uniform distribution of the air is secured so that the mass of material entering the offset discharge section is thoroughly aerated and its movement through the line greatly facilitated.

I claim:

1. Apparatus for conveying pulverulent material which comprises the combination of a casing having an inlet and an outlet, a shaft within the casing, means on the shaft for propelling the material through the casing from inlet to outlet, a ring near the outlet of the casing encircling the shaft and made up of a body and a bushing within the body, the bushing extending from end to end of the body to form the inner face thereof, the body having a circumferential channel in its inner face closed by the bushing to form a passage, a plurality of ports in the bushing communicating with the passage, and means for supplying air under pressure through the passage to these ports for injection into the material moved through the ring by the propelling means.

2. Apparatus for conveying pulverulent material which comprises the combination of a casing having an inlet and an outlet, a shaft within the casing, means on the shaft for propelling the material through the casing from inlet to outlet, a ring encircling the shaft and made up of a body and a bushing lying within the body to form the inner face of the ring, this bushing extending beyond either end of the body and serving as a continuation of the casing wall, a passage extending circumferentially of the body, a plurality of ports in the ring disposed in a row between the ends thereof, these ports being in communication with the passage, and means for supplying air under pressure to the ports through the passage for injection into the material moved through the ring by the propelling means.

3. Apparatus for conveying pulverulent material which comprises the combination of a casing having an inlet and an outlet, a shaft within the casing, means on the shaft for propelling the material through the casing from inlet to outlet, a ring forming a part of the casing wall and comprising a body in the form of a ring having a circumferential channel in its inner face between the ends thereof, a bushing placed within the body in contact with the entire inner face thereof and closing the channel, a row of ports in the bushing communicating therethrough with the passage, and means for supplying air under pressure through the passage to the ports for injection into the material moved through the ring by the propelling means.

4. Apparatus for conveying pulverulent material which comprises the combination of a casing having an inlet and an outlet, a discharge line connected to the outlet, a shaft within the casing, means on the shaft for propelling the material through the casing from inlet to outlet and into the discharge line, a ring connected to the casing at its outlet end and having an inner face member extending beyond either face of the ring and cooperating with the casing and the discharge section to form a continuous passage of substantially uniform diameter for the flow of material, a plurality of ports in the member opening into the middle thereof, and means for supplying air under pressure to these ports for injection into the material moved through the ring by the propelling means.

5. Apparatus for conveying pulverulent material which comprises the combination of a casing having an inlet and an outlet, a shaft within the casing, means on the shaft for propelling the material through the casing from inlet to outlet, a ring encircling the shaft and comprising a body member and a liner, the latter forming a part of the casing wall, a circumferential channel in the inner face of the body member closed by the liner member to provide a passage, a plurality of ports in the liner member communicating with the passage and opening into the middle of the ring, an inlet and an outlet in the body member communicating with the passage, and means for supplying air under pressure through the inlet to the passage for injection through the ports into the material moved through the ring by the propelling means.

6. Apparatus for conveying pulverulent material which comprises the combination of a casing having an inlet and an outlet, a shaft within the casing, means on the shaft for propelling the material through the casing from inlet to outlet, a ring encircling the shaft and having an inner face forming a part of the casing wall, a passage in the ring extending circumferentially, a plurality of ports in the inner face of the ring communicating with the passage and opening into the middle of the ring, an inlet for supplying air under pressure to the passage for injection through the ports into the material moved through the ring by the propelling means, and an outlet from the passage for removing material which may have entered the latter.

7. Apparatus for conveying pulverulent material which comprises the combination of a casing having an inlet and an outlet, a shaft within the casing, means on the shaft for propelling the material through the casing from inlet to outlet, a removable ring encircling the shaft and having an inner face forming a part of the casing wall, ports in the inner face of the ring disposed at an angle to the central axis thereof with the axes of the upper ports inclined at a greater angle to the central axis of the ring than the axes of the lower ports, and means for supplying air under pressure to the ports for injection into the material propelled through the ring.

8. An air ring for injecting a gas into a column of material delivered by a conveyer, which comprises a circular body portion through which the material passes, a liner lying within the body portion and contacting with the inner face of the body portion substantially throughout the length of the latter, this liner having a portion of increased internal diameter between its ends and extending circumferentially thereof, ports formed in the liner member in the said portion of increased internal diameter, these ports lying in a row extending throughout the circumference of the liner member, and means for leading air through the body portion for injection through the ports into the material.

9. An air ring for injecting a gas into a column of material delivered by a conveyer, which comprises a circular body portion through which the material passes, a bushing lying within the body portion and in contact with the said portion throughout its length, a channel extending circumferentially around the body portion, this channel being closed by the bushing to form a passage, a plurality of ports formed in the bushing and communicating with the passage and means for supplying air under pressure to the passage.

10. An air ring for injecting a gas into a column of material delivered by a conveyer, which comprises a circular body portion through which the material passes, a bushing lying within the body portion and forming the inner face thereof, this bushing having a portion of increased internal diameter, a channel formed in the inner face of the ring and extending circumferentially around the ring, this channel being closed by the bushing to form a passage, a plurality of ports formed in the bushing and communicating with the passage, these ports opening into the portion of increased diameter, and means for supplying air under pressure to the passage.

11. An air ring for injecting a gas into a column of material delivered by a conveyer, which comprises a circular body portion through which the material passes, a bushing lying within the body portion and forming the inner face thereof, the inner face of this bushing having an angularly inclined shoulder, a channel formed in the inner face of the body portion and closed by the bushing to form a passage extending around the ring, a plurality of ports formed in the bushing and communicating with the passage, these ports opening through the inclined shoulder, and means for supplying air under pressure to the passage.

12. An air ring for injecting a gas into a column of material delivered by a conveyer, which comprises a circular body portion through which the material passes, a channel in the inner face of the body portion, a bushing disposed in the body portion and having a channel in its outer face cooperating with the first channel to form a passage, a plurality of ports in the inner face of the bushing communicating with the passage, and means for admitting air under pressure to the passage.

13. An air ring for injecting gas into a column of material delivered by a conveyer which comprises a circular body portion through which the material passes having a circumferential channel in its inner face, a bushing contacting with the entire inner face of the said body portion and closing the channel to form a passage, a liner of wear-resistant material mounted to form the inner face of the bushing, a plurality of ports arranged in a circumferential line through the liner, and means for supplying air under pressure through the passage to the ports.

14. Apparatus for conveying pulverulent material, which comprises the combination of a casing having an inlet and an outlet, a shaft within the casing, means on the shaft for propelling the material through the casing to the outlet, a ring encircling the shaft and secured to the end of the casing, this ring having a body portion provided with a circumferential channel in its inner face and a bushing within the body portion and covering the entire inner face, this bushing closing the channel to form a passage, a circumferential row of ports in the bushing communicating with the passage, these ports being directed at an angle to the axis of the ring and in the direction of movement of the material, a boss on the ring having a passage therethrough communicating with the circumferential passage, and means for supplying air through the passage in the boss to the ports for injection into the material propelled through the ring.

15. In a conveying device the combination of a casing having means therein arranged to advance material through the casing, a ring at the end of the casing for injecting air into the material flowing therethrough and including a member through which the material passes in contact therewith and having a surface out of contact with the material, said surface being provided with a plurality of ports arranged circumferentially of the member, and a second member surrounding and supporting the first, means for supplying air under pressure to the ports for injection into the material, and a discharge section having one end abutting both members of the ring and arranged to receive the material passing therethrough.

16. In a conveying device the combination of a casing having means therein arranged to advance material through the casing, a ring at the end of the casing for injecting air into the material flowing therethrough and including a member through which the material passes in contact therewith having a surface out of contact with the material, said surface being provided with a plurality of ports arranged circumferentially of the member and with a channel formed in the member behind said surface for the distribution of air to said ports, and a second member surrounding and supporting the first, means for supplying air under pressure to said channel, and a discharge section disposed to receive material passing through the said ring.

17. In a conveying device the combination of a casing having means therein arranged to advance material through the casing, a ring at the end of the casing for injecting air into the material flowing therethrough and including a member having an annular surface, the material flowing through this member in contact with the surface, the member also having a second surface inclined to the first and out of contact with the material and provided with a plurality of ports arranged circumferentially of the member, and a second member surrounding and supporting the first, means for supplying air under pressure to the ports, and a discharge section having one end abutting both members of the ring and arranged to receive material passing through the ring.

18. In a conveying device the combination of a casing having a conveyer screw therein arranged to advance material through the casing, a ring at the end of the casing for injecting air into the material flowing therethrough and including a member forming a continuation of the wall of the casing and through which the material passes in contact therewith, this member having a surface out of contact with the material provided with a plurality of ports arranged circumferentially of the member, and another member surrounding and supporting the first, means for supplying air under pressure to said ports, and a discharge section adjacent the ring and arranged to receive the material passing therethrough.

In testimony whereof I affix my signature.

ALONZO G. KINYON.